United States Patent
Foley et al.

[15] 3,671,827
[45] June 20, 1972

[54] DIRECTION REVERSING CONTROL FOR A MACHINE CONTROL SYSTEM

[72] Inventors: Richard G. Foley, Dayton; James E. Murray, University Heights, both of Ohio

[73] Assignee: Harris-Intertype Corporation, Cleveland, Ohio

[22] Filed: Nov. 27, 1970

[21] Appl. No.: 93,375

[52] U.S. Cl. ............................................. 318/162, 318/567
[51] Int. Cl. ...................................................... G05b 19/02
[58] Field of Search .................. 318/158, 272, 443, 444, 600, 318/574, 162, 264, 265, 286, 567, 568; 83/71; 307/149

[56] References Cited

UNITED STATES PATENTS

| | | | |
|---|---|---|---|
| 3,003,094 | 10/1961 | Gough, Jr. | 318/574 |
| 3,025,444 | 3/1962 | Myska | 318/574 |
| 3,192,808 | 7/1965 | Fielder et al. | 318/600 X |

*Primary Examiner*—Harold Broome
*Assistant Examiner*—W. E. Duncanson, Jr.
*Attorney*—Yount and Tarolli

[57] ABSTRACT

A machine control system, such as a control for a paper cutting machine, is provided for purposes of reversing the direction of travel of a movable member, such as a back gauge in a paper cutting machine, driven by a reversible motor between forward most and rearward most positions relative to a work station. A control record has two spaced marks recorded thereon for defining the forward most and rearward most positions. A mark sensor serves to sense the marks and in response to each mark provides a reverse signal pulse. Relative motion is provided between the control record and the sensor proportional to the velocity of the movable member. A memory is actuated to one of two stable states in dependence upon the direction the movable member is traveling when a reverse mark is sensed. The commanded condition of the memory together with the occurrence of a reverse signal pulse generated in response to the sensed reverse mark, causes the motor to reverse and drive the movable member in the opposite direction. In addition, circuitry is provided to prevent the motor from reversing in response to a reverse mark when the movable member is traveling in a backward direction until a position command signal, also recorded on the control record, is sensed by a second sensor.

17 Claims, 5 Drawing Figures

INVENTORS
RICHARD GREGORY FOLEY
JAMES EMMETT MURRAY
BY Young and Tarolli
ATTORNEYS INVENTORS
RICHARD GREGORY FOLEY
JAMES EMMETT MURRAY
BY Yount and Tarolli
ATTORNEYS

DIRECTION REVERSING CONTROL FOR A MACHINE CONTROL SYSTEM

This invention relates to the art of machine control systems and, more particularly, to improvements for reversing the direction of travel of a movable member, such as a back gauge in a paper cutting machine, in dependence upon command marks recorded on a control record.

The invention is particularly applicable for use in conjunction with controlling the direction of movement of a back gauge in a paper cutting machine; however, it is to be appreciated that the invention is not limited thereto as it may be employed in various machine tool systems wherein it is desired to control reversing movement of a movable member relative to a work station.

Paper cutting machines typically comprise a worktable upon which a back gauge is slideably movable for purposes of positioning a pile of material, such as paper, to be cut by a guillotine type cutting tool. The positioning of the back gauge, and, hence, the pile of material to be cut, is controlled pursuant to a cutting program typically recorded as magnetic or optical marks on a control record. More than one cutting program may be recorded on the control record with each program having position command marks as well as direction reverse marks respectively recorded on different channels. Several position command marks may be recorded for a particular program whereas usually only two direction reverse marks are recorded respectively representative of the beginning and ending boundaries of the program. The beginning boundary, for example, may be representative of the rearward most limiting position of the back gauge with the ending boundary being indicative of the forward most limiting position of the back gauge as it travels relative to the cutting tool. As the back gauge is being advanced toward the cutting tool it is periodically decelerated to a stop condition in response to a position command mark being sensed by a position sensor. A cutting operation is then performed and the back gauge may be further advanced toward the cutting tool. The back gauge will be stopped in dependence upon the number of position command marks recorded for the particular cutting program. In some systems two position sensors are employed, one known as a deceleration sensor and the other being known as a stop sensor. Each position mark is sequentially sensed first by the deceleration sensor for purposes of decelerating the back gauge from a high speed to a low speed, and then by the stop sensor for decelerating the back gauge from the low speed to a stop condition so that a cutting operation may be performed.

As the back gauge is advanced toward the cutting tool both the position command sensor, as well as the reverse command sensor, operate to sense marks recorded in the respective position and direction channels. Normally, after all of the position command marks have been sensed the back gauge is reversed in its direction of travel in response to a trailing forward most direction command mark being sensed by the reverse sensor. The back gauge as well as the control record, in a system where the sensor is held stationary and the control record and back gauge are moved either at the same velocity or at proportional velocities, are then driven by a motor in a backward direction relative to the cutting tool until the reverse sensor senses a rearward most direction command mark. This causes the back gauge to be advanced in the forward direction. The momentum of the back gauge will cause it to over travel the forward most and rearward most travel limits and, consequently, the reverse mark that commanded the back gauge to reverse its direction of travel will again be seen as the back gauge commences to travel in the opposite direction. Proposals have been made to incorporate a time delay once a reverse mark has been sensed to prevent the direction reversing system from operating until the back gauge has had sufficient time to retraverse the normal over travel distance experienced when its direction of travel is reversed. This will prevent the back gauge from being immediately reversed back to its earlier direction of travel upon the mark being again sensed by the reverse sensor. However, considerable time is lost if the reversing system is delayed for this period of time. Consequently, it is desirable to provide control circuitry for commencing the reversing operation upon sensing of a reverse command mark while at the same time inhibiting the sensor circuitry from providing two reverse signals for the same reverse mark.

After the back gauge has traveled from its rearward most to forward most positions so as to complete a cutting program recorded on the position channel, a reverse mark is sensed in the direction channel to cause the back gauge to be driven in a backward direction. Frequently it is at this point that the operator may desire to use a different cutting program. The position and direction sensors are then shifted laterally of the control record so as to respectively sense position command marks and reverse command marks in different channels from that of the previous cutting program. If the forward most limiting marks in the various direction channels are not aligned, then when the reverse sensor is positioned to sense direction command marks in a new channel, the first reverse mark sensed, while the control record is moving in its backward direction, could well be the forward most limiting mark for the new program. The reversing system would, however, respond to the reverse command mark to drive the back gauge to a trapped position forwardly of the desired forward most position for the new program. It is for this reason that the forward most limiting reverse marks are normally recorded in lateral alignment on a control record. This, of course, will cause the back gauge to be driven to the same forward most position for each program independently of the number of cutting operations to be performed. Also, considerable time may be required for recording a new program to assure that the forward most limiting marks are in alignment. It is desirable, therefore, that means be provided so that these forward most limiting marks need not be in alignment while at the same time preventing the reversing circuitry from advancing the back gauge in a forward direction when the reverse sensor head senses the forward most limiting reverse mark on the direction control channel for the new program.

The present invention contemplates that a machine control system be provided and which serves to control movement of a movable member, such as a back gauge in a cutting machine, driven by a reversible motor in either a forward or backward direction relative to a work station, such as a cutting tool, and between forward most and rearward most positions in dependence upon an operating program which includes both position defining command marks and direction reverse command marks respectively recorded on different channels of a control record.

In accordance with one aspect of the present invention, the control record includes two spaced marks recorded thereon for defining the forward most and rearward most positions. A mark sensor is employed for providing a reverse signal pulse in response to each mark sensed. Relative motion is imparted between the control record and the sensor in dependence upon the direction of travel of the movable member. A direction memory is provided with input and output circuits together with a trigger pulse receiving circuit and exhibits the characteristic of being actuated by a received trigger pulse to first and second stable state output circuit conditions in dependence upon first and second input circuit conditions existing when a trigger pulse is received. A trigger pulse is applied to the memory for each reverse signal pulse. A direction command circuit is controlled by the memory to, in turn, control the reversible motor to drive the movable member in the backward direction when the memory is actuated to its first output circuit condition and in the forward direction each time the memory is actuated to its second output circuit condition. Memory conditioning circuitry is provided for conditioning the memory input circuit to the second condition when the member is traveling in the backward direction, and to the first condition when the member is traveling in the forward direction.

In accordance with another aspect of the present invention, the control record includes a position channel having position command marks recorded thereon to define desired positions of the movable member relative to the work station, and a direction channel having two direction reverse command marks recorded thereon at spaced locations defining the beginning and ending boundaries of a program. Both a position mark sensor and a reverse mark sensor are provided for respectively sensing the position and reverse marks and providing for each respectively sensed mark a position signal pulse and a reverse signal pulse. Relative motion is imparted between the control record and the sensor means in dependence upon the forward and backward direction of travel of the movable member relative to the work station. A reverse control circuit normally responds to each reverse signal pulse for controlling the motor to reverse the direction of travel of the movable member. An indication is provided representative that a sensed reverse mark commanded the member to be changed in its direction of travel from the forward direction to the backward direction. A control circuit is responsive to the indication to prevent the reverse control circuit from responding to a reverse mark while the member is driven in the backward direction until a position mark is sensed by the position sensor.

The primary object of the present invention is to improve the accuracy of positioning and reversing the direction of movement of a movable member relative to a work station in a machine tool control system.

It is a more specific object of the present invention to provide improved control of the reversing operation of a back gauge in a paper cutting machine, or the like, wherein the back gauge is periodically reversed in its direction of movement pursuant to commands from a control record.

A still further object of the present invention is to provide improved circuit means for providing indications as to whether, in response to a reverse mark, a movable member, such as a back gauge, should be driven in a forward direction or a backward direction relative to a work station.

A still further object of the present invention is to provide means so that the forward most limiting marks recorded on different direction command channels of a control record need not be in alignment, while at the same time preventing associated reversing circuitry from advancing the movable member in a forward direction when a reverse sensor senses the forward most limiting reverse mark on the direction control channel for a new program.

The foregoing and other objects and advantages of the invention will become more readily apparent from the following description of the preferred embodiment of the invention taken in conjunction with the accompanying drawings which are a part hereof and wherein.

Figure 1:
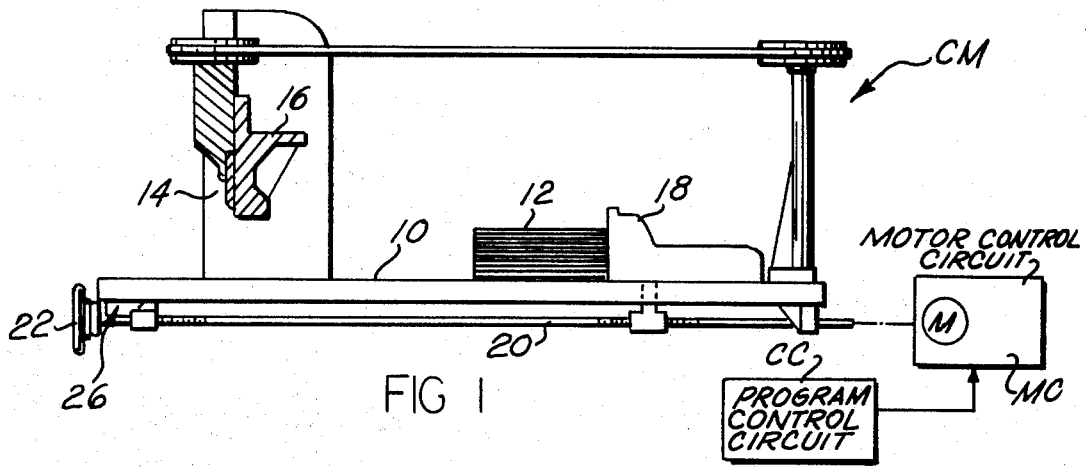
FIG. 1 is a side view of a paper cutting machine to which the present invention may be applied.

Referring now to the drawings wherein the showings are for purposes of illustrating the preferred embodiment of the invention only and not for purposes of limiting same, FIG. 1 illustrates a paper cutting machine CM including a table 10 upon which a stack of material 12, such as paper, is placed to be cut by a knife 14. During the cutting operation, material 12 is held in place by a clamp 16. A back gauge 18, slideably movable along table 10, serves to position the material 12 beneath the knife. Back gauge 18 is slideably moved along the surface of the table 10 in a forward direction toward knife 14, or in a backward direction away from the knife, by means of a lead screw 20 rotatably supported beneath the table. Lead screw 20 may be turned to adjust the position of back gauge 18 by means of a hand wheel 22. During normal operation, however, it is contemplated that lead screw 20 be turned by means of a dual speed, reversible direction, electric motor M for positioning the back gauge as well as its direction of movement in dependence upon commands from a position controller 26.

Figure 2:
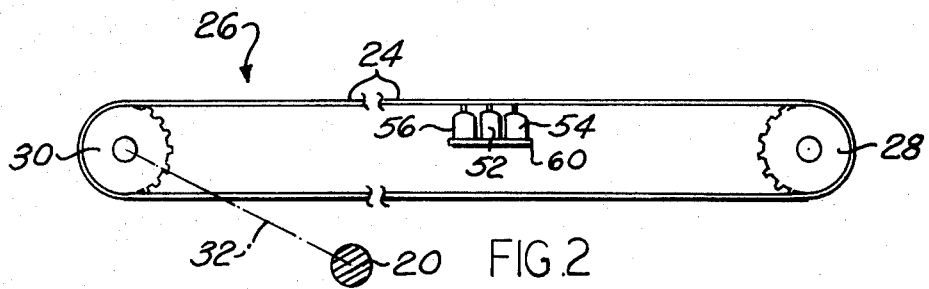
FIG. 2 is a front elevational view showing a magnetic control record having command marks magnetically recorded thereon together with magnetic sensors for controlling the positioning and direction of movement of a back gauge relative to a cutting tool.
Figure 3:
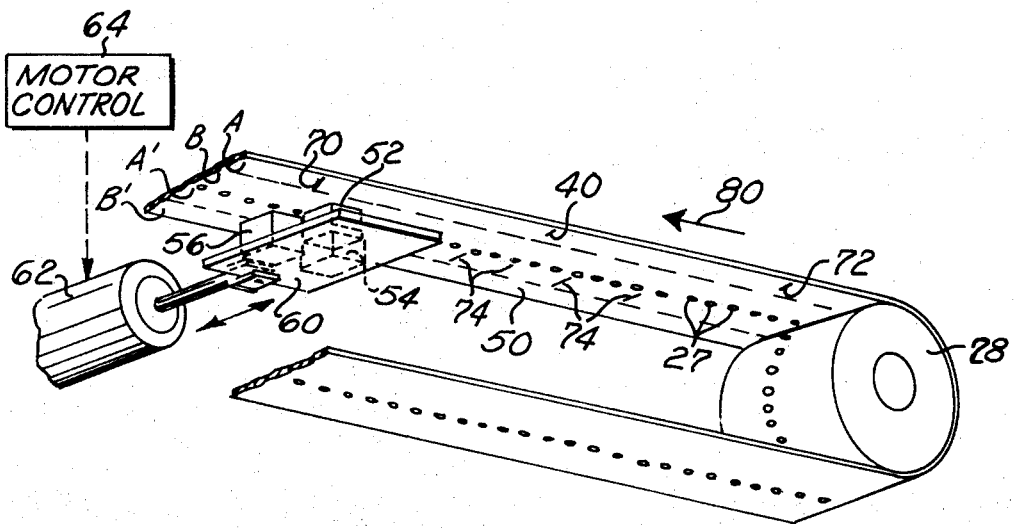
FIG. 3 is an enlarged perspective view of a portion of the control record as well as the sensors shown in FIG. 2.

The position controller 26, as shown in FIGS. 2 and 3, includes a control record, such as record member 24, taking the form of a magnetic tape formed into a continuous belt divided longitudinally throughout its length by a plurality of evenly spaced sprocket holes 27. The record member 24 is reeved over sprocket wheels 28 and 30 so that the sprocket holes 27 mesh with teeth provided on the two sprocket wheels. Sprocket wheel 30 is driven by lead screw 20, as through a coupling chain 32, so that record member 24 is driven in a direction and at a speed dependent on that of back gauge 18. Whereas record member 24 is illustrated as being driven at a speed having a 1:1 ratio with back gauge 18, it is contemplated that speed reduction means may be provided so that the speed relationship, while proportional, need not be at a 1:1 ratio.

Record member 24 may be divided into a large plurality of longitudinally extending channels on which magnetic marks are recorded. The record member is divided longitudinally in half by sprocket holes 27 to define channel sides 40 and 50. Channel side 40 may include the channels for storing reverse marks to cause a change in the direction of travel of back gauge 18, whereas channel side 50 may include channels on which position marks are recorded for purposes of causing positioning control of back gauge 18. For purposes of simplifying the description of the present invention, channel side 40 is divided into two channels A and B, and channel side 50 is divided into two corresponding channels A' and B'. One program will include two related channels, such as channel A and channel A' for a first program A–A', and channel B and channel B' for a second program B–B'. Three magnetic mark sensors are provided for sensing the magnetic marks. Sensor 52 is employed for purposes of sensing direction command or reverse marks located in either channel A or channel B, whereas sensors 54 and 56 serve to sense position command marks located in either channel A' or channel B'. The three sensors are mounted on a support 60 so as to be driven laterally relative to record member 24 by means of a motor 62 under the control of a suitable motor control circuit 64. Thus, when it is desired to switch operations from program A–A' to program B–B' the motor is energized so as to displace support 60 so that sensor 52 responds to reverse marks recorded in channel B, and so that sensors 54 and 56 respond to position command marks recorded in channel B'.

When the back gauge is being driven in its forward direction toward cutting tool 14, each position command mark for the program in operation is sequentially sensed first by sensor 54 and then by sensor 56. Sensor 54 is typically known as the deceleration sensor since it serves to provide a low speed control signal which through suitable circuitry (not shown) controls motor M to decelerate forward movement of the back gauge from a normal high speed to a low speed. When sensor 56, known as the stop sensor, senses the same mark it provides a stop signal which through suitable circuitry (not shown) controls motor M to decelerate forward movement of the back gauge from the low speed to a stop condition at which time a cutting operation is performed. Between the rearward most and forward most travel positions of back gauge 18 a cutting program may require the back gauge to be stopped at a plurality of positions in dependence upon the position command marks recorded on channel A' or channel B'. The forward most limiting position desired for the forward travel of back gauge 18 for a particular program is defined by a reverse mark located on channel A or B, depending on the program involved. The rearward most limiting position desired for the backward travel of back gauge 18 is defined by another reverse mark recorded on channel A or B, depending on the program employed. For example, with reference to FIG. 3, reverse mark 70 in channel A is representative of the desired rearward most position of back gauge 18 for program A-A'. The forward most limiting position for this program may be represented by reverse mark 72 located in channel A. Within the confines of this travel distance various stop defining positions for back gauge 18 are provided by position command marks 74 located in channel A'.

During the operation of the cutting machine pursuant to program A-A', motor M will drive back gauge 18 in a forward direction toward cutting tool 14 and thereby cause record member 24 to be driven in its forward direction, as indicated by arrow 80 in FIG. 3. On the assumption that mark 70 is located in advance of sensor 52, then sensors 54 and 56 will sequentially sense each mark 74 so that back gauge 18 is first decelerated to a low speed and then decelerated to a stop condition at which time a cutting operation is performed. After the last position command mark 74 has been sensed a trailing reverse mark, in this case mark 72, will be sensed by reverse sensor 52. The reverse sensor develops a reverse signal pulse which is applied to a program control circuit, to be described in greater detail hereinafter, for purposes of reversing the operation of motor M so that back gauge 18 and, hence, record member 24 are driven in a backward direction. As the record member is driven in the backward direction, sensors 54 and 56 do not respond to position marks 74 for purposes of decelerating and then stopping movement of back gauge 18. However, as the back gauge is moved to the desired rearward most position for cutting program A-A', sensor 52 will sense reverse mark 70 to produce a reverse signal pulse which is applied to the program control circuit to reverse the direction of travel of back gauge 18 so that it will now travel in a forward direction.

Figure 5:
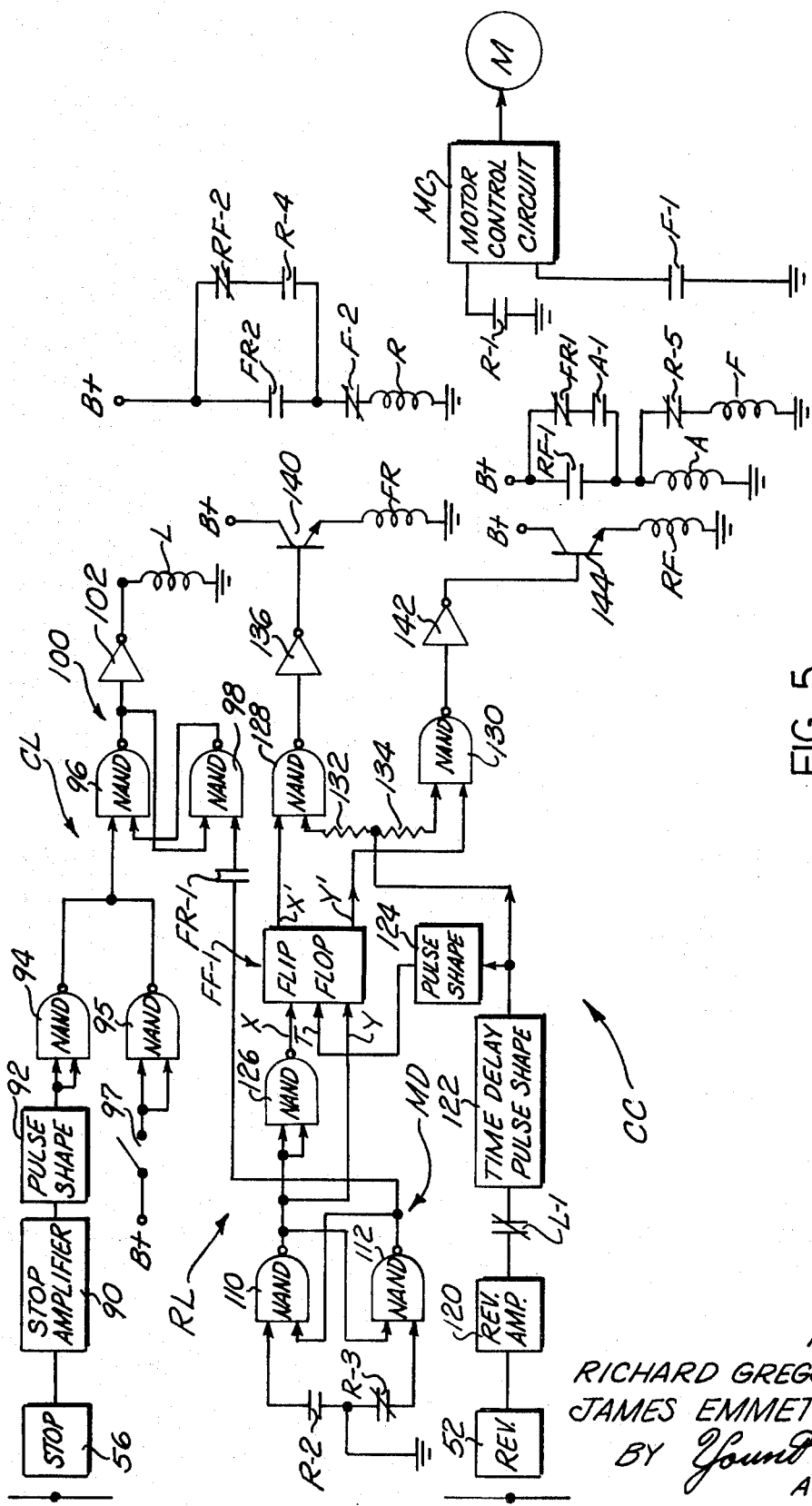

In accordance with the present invention, the output signal pulses developed by the reverse sensor 52 and the stop sensor 56 are applied to a program control circuit CC for purposes of controlling a conventional motor control circuit MC to control motor M to drive back gauge 18 in either the forward or backward directions. Within control circuit CC, as shown in FIG. 5, the stop sensor 56 has its output circuit connected to a channel centering logic circuit CL and the output circuit of reverse sensor 52 is connected to a reversing logic circuit RL. In a broad sense, the reversing logic circuit serves to control the motor so as to drive the back gauge 18 in either the forward direction or in the backward direction in dependence upon the direction the back gauge was proceeding at the point in time a reverse mark is sensed. The centering logic circuit CL prevents the back gauge from being reversed in its direction of travel from its backward direction to its forward direction in response to a reverse mark being sensed until a position mark is sensed by sensor 56.

The channel centering logic circuit CL includes a stop amplifier 90 of conventional design having its input circuit connected to the output circuit of stop sensor 56. The stop signal pulse, as amplified by amplifier 90, is then shaped by a suitable pulse shaping circuit 92 to provide a positive or binary "1" signal pulse of a given magnitude and duration. This binary "1" signal is applied to both inputs of an NAND gate 94, serving as an inverter amplifier, to produce a binary "0" signal for each position mark sensed by stop sensor 56. The output circuit taken from NAND gate 94 is applied as one input to a NAND gate 96, which is connected together with an additional NAND gate 98 to define a bistable multivibrator or flip-flop 100. The second input of NAND gate 98 is obtained from the reverse logic circuit RL through normally open relay contacts FR-1. The output of flip-flop 100 is taken from the output circuit of NAND gate 96 and applied to an inverter amplifier 102 whose output circuit is, in turn, connected through a relay coil L to ground. Consequently, whenever the output of flip-flop 100 is a binary "0" signal, relay coil L is energized to open its normally closed relay contacts L-1. So long as relay coil L is deenergized, relay contacts L-1 are closed. Relay contacts L-1 are located in the reverse logic circuit RL and, when open, serve to prevent a reverse signal pulse developed by reverse sensor 52 from being processed by the reverse logic circuit RL. A manual reset is provided for deenergizing the coil L. The reset is obtained with a NAND gate 95 having its output circuit connected to one of the input circuit of NAND gate 96. Upon closure of a switch 97, binary "1" signals are applied to NAND gate 95, causing the output circuit of flip-flop 100 to carry a binary "1" signal and thereby deenergize relay coil L.

The reversing logic circuit RL basically includes a back gauge direction memory in the form of a J-K flip-flop FF-1, a memory driving circuit MD and motor direction command controls in the form of a forward to reverse relay coil FR and a reverse to forward relay coil RF. When coil FR is momentarily energized a command is given to change the direction of travel of the back gauge from its forward direction to its backward direction. When relay coil RF is momentarily energized a command is given to drive the back gauge in the forward direction. A momentary energization of the forward to reverse relay coil FR, as will be described in greater detail hereinafter, causes a motor reverse relay coil R to be energized to close its normally open relay contacts R-1 to operate a conventional motor control circuit MC to control motor M to drive back gauge 18 in the backward direction. Similarly, whenever the reverse to forward coil RF is momentarily energized it causes a motor forward relay coil F to become energized to close its normally open relay contacts F-1 to operate the motor control circuit MC to control motor M to drive back gauge 18 in the forward direction.

The memory drive circuit MD includes a pair of normally open reverse relay contacts R-2 and a pair of normally closed reverse relay contacts R-3, both operated by the reverse relay coil R. These contacts are connected together in series with the junction thereof being connected to ground. Contacts R-2 provide a circuit between ground and one input of a NAND gate 110 and relay contacts R-3 provide a circuit between ground and one input of NAND gate 112. NAND gates 110 and 112 are connected together to define a bistable multivibrator circuit which is used as a conventional relay antibounce flip-flop circuit. The output of NAND gate 112 is connected in series with normally open relay contacts FR-1 to one input of NAND gate 98 in the center logic circuit CL.

If the back gauge is traveling in the forward direction then relay coil R is deenergized. Consequently, its relay contacts R-3 are closed and the output circuit of NAND gate 112 carries a binary "1" signal. If at this point in time the forward to reverse coil FR is momentarily energized, to command movement in a backward direction, then its relay contacts FR-1 will momentarily close. But, relay coil FR is energized long enough for relay coil R to become energized and thereby cause its contacts R-3 to open. Thus, NAND gate 112 applies a binary "0" signal pulse through contacts FR-1 to NAND gate 98. If at this point in time stop sensor 56 is not sensing a position command mark, then NAND gate 94 applies a binary "1" signal to the other input of NAND gate 96. Consequently, the output circuit of NAND gate 96 carries a binary "0" signal which is inverted by inverter amplifier 102 to energize relay coil L. This causes relay contacts L-1 to open so that as the back gauge starts to travel in the backward direction, the reverse sensor 52 will not be effective. This condition will prevail until stop sensor 56 senses a position command mark at which time NAND gate 94 applies a binary "0" signal to NAND gate 96 to cause relay coil FL to be deenergized. Thereafter, the next reverse mark sensed by reverse sensor 52 will be effective to cause reversal of the direction of the movement of back gauge 18.

The output circuit of reverse sensor 52 is coupled to a conventional amplifier 120 which applies the amplified signal through normally closed relay contacts L-1 to a time delay pulse shaping circuit 122. Circuit 122 serves upon receipt of each reverse signal pulse to provide an elongated signal pulse which has a time duration in excess of the time required for a mark to be sensed by reverse sensor 52 and then retraversed passed the sensor. Thus, circuit 122 provides only a single pulse each time a mark is sensed by sensor 52. The output of pulse shaping circuit 122 is applied to another pulse shaping circuit 124 that serves to provide a trigger pulse of substantially shorter duration than the pulse provided by shaping circuit 122 and at substantially at the point in time corresponding with the leading edge of the pulse provided by circuit 122. This trigger pulse is applied to the trigger input of the J-K flip-flop FF-1.

Flip-flop FF-1, in a conventional fashion, includes first and second input circuits X and Y and corresponding output circuits X' and Y'. As is well known, once a trigger pulse is applied to input trigger circuit T the pattern of binary signals on input circuits X and Y is transferred to output circuits X' and Y'. Input circuit Y is directly connected to the output circuit of NAND gate 110. Input circuit X is connected to the output circuit of a NAND gate 126 having both its input circuits connected to the output circuit of NAND gate 110. Hence, NAND gate 126 merely serves as an inverter amplifier. Output circuit X' is connected to one input circuit of a NAND gate 128, whereas output circuit Y' is connected to one input circuit of NAND gate 130. The second input circuit of NAND gate 128 is connected to the output circuit of pulse shaper circuit 122 through a resistor 132. Similarly, the second input circuit of NAND gate 130 is connected to the output circuit of pulse shaping circuit 122 through a resistor 134. An inverter amplifier 136 is connected between the output circuit of NAND gate 128 and the base of an NPN transistor 140 having its collector connected to a B+ voltage supply source and its emitter connected through relay coil FR to ground. Similarly, an inverter amplifier 142 connects the output circuit of NAND gate 130 to the base of an NPN transistor 144 having its collector connected to a B+ voltage supply source and its emitter connected through the reverse to forward relay coil RF.

The forward to reverse relay coil FR and the reverse to forward relay coil RF are respectively energized for momentary time durations dependent upon the time duration of a gating pulse provided by shaping circuit 122. When relay coil FR is momentarily energized it is indicative that the back gauge is traveling in the forward direction and it is now to reverse its direction and proceed in the forward direction. Conversely, when the reverse to forward relay coil RF is momentarily energized it is indicative that the back gauge is traveling in the backward direction and should now proceed to travel in the forward direction.

When relay RF is momentarily energized its normally open relay contacts RF-1 become closed to complete a circuit between a B+ voltage supply source and ground through a holding relay coil A. Consequently, normally open relay contacts A-1 of the holding relay become closed to maintain coil A energized through normally closed relay contacts FR-1. In addition, during the period that relay coil RF is energized its normally closed contacts RF-2 become open to deenergize reverse relay coil R. Consequently, normally closed reverse relay contacts R-5 become closed so that the forward relay coil becomes energized. When relay coil F is energized, its normally closed relay contacts F-2 open to prevent re-energization of relay coil R and its normally open contacts F-1 become closed so that motor M is operated to drive the back gauge in the forward direction.

When the forward to reverse relay coil FR is momentarily energized its normally closed relay contacts FR-1 open to break the holding circuit and thereby deenergize relay coil A as well as the forward relay coil F. Consequently, the normally closed forward relay contacts F-2 become closed. Since relay coil FR is energized for a period of time sufficient for relay contacts F-2 to become closed, a circuit is now completed through relay contacts FR-2 to energize the reverse relay coil R. Once relay coil R is energized its normally open contacts R-4 become closed to complete a holding circuit through normally closed contacts RF-2 around relay contacts FR-2.

Figure 4:
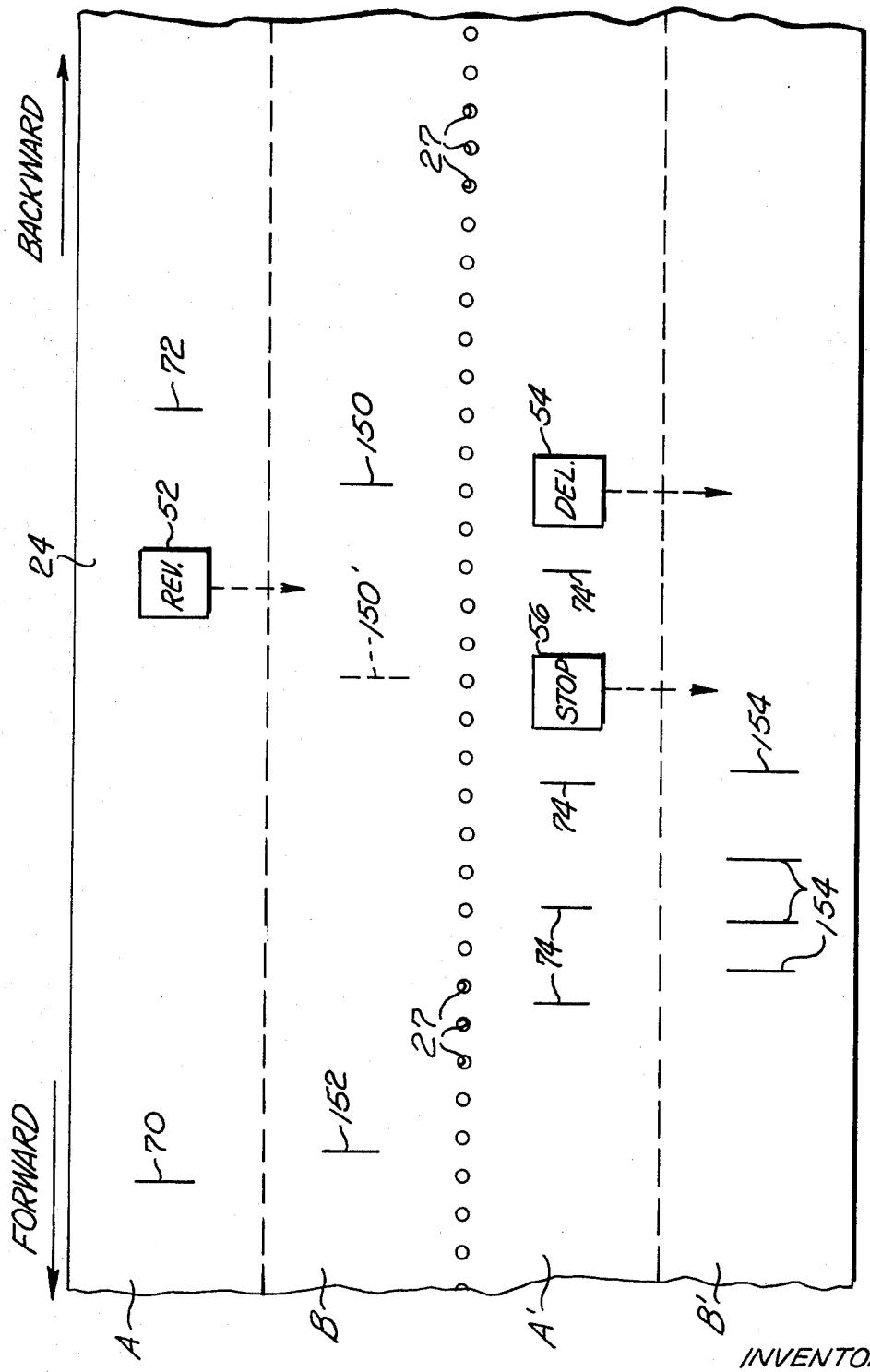
FIG. 4 is an enlarged schematic illustration of a portion of the control record together with the sensors shown in FIGS. 2 and 3; and, FIG. 5 is a combined schematic-block diagram illustration of the control circuitry employed in the present invention.

Reference is now made both to FIGS. 4 and 5 in conjunction with the operation which ensues first with the back gauge 18 traveling in a forward direction and then when it is reversed and driven in a backward direction. As back gauge 18 is driven in the forward direction, record member 24 is driven at a proportional velocity in the same direction. Consequently, each position command mark 74 is sensed first by deceleration sensor 54 and then by stop sensor 56 to respectively provide deceleration and stop control signals so that suitable circuitry (not shown) serves for each sensed mark to first decelerate the back gauge from a high speed to a low speed and then decelerate the back gauge from the low speed to a stop condition. After the last position command mark 74 has been sensed by sensors 54 and 56, the forward limiting mark 72 will be sensed by reverse sensor 52. The reverse sensor 52 develops a reverse signal pulse which is amplified by amplifier 120 and applied through normally closed relay contacts L-1 to the time delay pulse shaping circuit 122. Since the back gauge has been traveling in its forward direction, relay coil R is not energized, and, consequently, its normally open contacts R-2 are open and its normally closed contacts R-3 are closed. The pulse shaping circuit 124 applies a trigger pulse in response to the leading edge of the time delay pulse from shaping circuit 122 to the trigger circuit T of flip-flop FF-1. Since relay contacts R-2 are open, the output circuit of NAND gate 110 carries a binary "0" signal. Consequently, a binary "1" signal is present on input circuit X and a binary "0" signal is present on input circuit Y of flip-flop FF-1.

In response to the trigger pulse applied to trigger circuit T, output circuit X' will now carry a binary "1" signal and output circuit Y' will carry a binary "0" signal. The elongated output signal pulse from shaping circuit 122 is applied to one input each of NAND gates 128 and 130, and, hence, for the time duration of that signal pulse transistor 140 and relay coil FR are energized. As previously described, this will cause the forward relay coil F to be deenergized and the reverse relay coil to become energized. When relay coil R is energized its normally open contacts R-2 close and its normally closed contacts R-3 open so that input circuit X of flip-flop FF-1 now carries the binary "0" signal, whereas input circuit Y now carries a binary "1" signal. This, however, will not affect the condition of output circuits X' and Y' which respectively carry binary "1" and binary "0" signals since the trigger pulse applied to trigger circuit T was of a shorter time duration than that required for relay coil R to become energized. This will prevent the flip-flop circuit from oscillating during the reversing operation and thereby accurately control the reversing operation of back gauge 18.

At this point in the operation of cutting machine CM, the operator may decide to shift to a new program, such as program B-B'. From FIG. 4 it will be noted that the forward travel limiting reverse mark 150 of channel B is not aligned with the forward travel limiting reverse mark 72 in channel A. To the contrary, mark 150 is located in advance of mark 72 by a distance greater than the over travel distance normally compensated for by the time delay pulse shaping circuit 122, described in detail hereinbefore. This means that as record member 24 starts to move in the backward direction, direction command mark 150 will be located in advance of sensor 52, as shown by the dotted lines 150'. Since the sensors will all be displaced to sense the marks in channels B and B', the reverse sensor 52 will develop a reverse signal in response to sensing mark 150. If the back gauge is now reversed in its direction of travel, it will be trapped in advance of its forward most limiting position for program B-B'. The problem may be obviated by aligning marks 72 and 150. However, this would require substantial programming time when recording the programs. It is preferable that reverse sensor 52 be, in effect, deactivated so as to not sense a reverse mark in channel B until the back gauge is driven to its rearward most limiting position, as denoted by mark 152. This function is accomplished by the channel centering logic circuit CL which requires that when programs are changed, such as from program A-A' to program B-B', a reverse signal pulse from sensor 52 will not be effective until stop sensor 56 has sensed one of the position command marks 154 on channel B'.

As the back gauge is driven in its backward direction, and prior to a position mark being sensed by stop sensor 56, relay coil L will be energized, as has been described in detail hereinbefore. Consequently, when mark 150 is sensed by reverse sensor 52 its output signal pulse as amplified by amplifier 120 will not be applied to the time delay pulse shaping circuit 122. Therefore, the reverse logic circuit RL is ineffective to respond to the reverse signal pulse. As the back gauge proceeds in its backward direction, stop sensor 56 will sense the first position command mark 154 on channel B'. The stop sensor develops a stop signal pulse which is amplified and shaped to cause binary "1" signals to be applied to both input circuits of NAND gate 94. Thus, NAND gate 94 will now apply a binary "0" signal to NAND gate 96 causing its output circuit to carry a binary "1" signal and thereby deenergize relay coil L. Relay contacts L-1 will now close so that the relay logic circuit RL will respond to the next reverse mark sensed by reverse sensor 52.

The back gauge will continue to move in its backward direction until reverse sensor 52 senses reverse mark 152 in channel B. Reverse sensor 52 develops a reverse signal pulse which is applied to the time delay pulse shaping circuit which, as described in greater detail hereinbefore, will cause relay coil RF to become momentarily energized so as to control motor M to drive the back gauge in the forward direction. Back gauge 18 will now proceed toward the cutting tool 14 and cutting operations will be performed in dependence upon position command marks 154.

The invention has been described with reference to a preferred embodiment, however, it is to be appreciated that the invention is not limited to same as various modifications may be made without departing from the spirit and scope of the invention as defined by the appended claims.

What is claimed is:

1. In a machine control system for controlling the positioning and direction of travel of a movable member driven by a reversible motor in either a forward or backward direction relative to a work station in dependence upon an operating program and comprising:
   a control record having command marks recorded thereon including a position channel having position command marks to define desired positions of said movable member relative to said work station and an associated direction channel having two direction reverse command marks recorded thereon at spaced locations defining the beginning and ending program boundaries of the associated position channel;
   position mark sensor means and reverse mark sensor means for respectively sensing said position marks and reverse marks and providing for each respectively sensed mark a position signal pulse and a reverse signal pulse;
   means for imparting relative motion between said control record and said sensor means in dependence upon the forward and backward directions of travel of said movable member relative to said work station;
   reverse control circuit means for normally responding to each said reverse signal pulse for controlling said motor to reverse the direction of travel of said member;
   means for providing an indication representative that a sensed reverse mark commanded said member to change its direction of travel from forward to backward; and
   control circuit means responsive to said indication to prevent said reverse control circuit means from responding to a said reverse mark until said position sensor means senses a said position mark.

2. In a machine control system as set forth in claim 1, wherein said record member is provided with a plurality of associated said position and direction channels for different operating programs.

3. In a machine control system as set forth in claim 2, including means for adjustably positioning said position and said reverse mark sensor means to respond to position and reverse marks of a selected one of said programs.

4. In a machine control system as set forth in claim 3, wherein said different position channels each have a forward most defining reverse mark and a said rearward most defining reverse mark, each said forward most defining reverse mark being recorded at a location on said control record so as to be representative of a desired forward most position of said movable member for the associated program and located independently of a forward most defining reverse mark associated with a different program.

5. In a machine control system as set forth in claim 1, wherein said reverse control circuit means includes direction command means for providing a forward to reverse command signal pulse each time said reverse control circuit means responds to a said reverse mark when said movable member is traveling in a forward direction.

6. In a machine control system as set forth in claim 5, wherein said indication providing means includes switching means having a normal first condition and controlled by said direction command means so as to be at least momentarily actuated to a second condition for each said command signal pulse.

7. In a machine control system as set forth in claim 6, including circuit means for providing a distinctive signal when said movable member is traveling in said backward direction;
   said control circuit means including bistable means having a normal first condition and being actuated to a second condition in response to receiving a said distinctive signal when said switching means is actuated to its second condition.

8. In a machine control system as set forth in claim 7, including sensor disconnecting means for disconnecting said reverse sensor means from said reverse control circuit means when said bistable means is in its second condition.

9. In a machine control system as set forth in claim 8, wherein said control circuit means includes stop signal circuit means interposed between said stop sensor means and said bistable means to actuate said bistable means from its second condition to its first condition in response to a said stop signal pulse, whereby said reverse sensor means is reconnected to said reverse control circuit means.

10. In a machine control system for reversing the direction of travel of a movable member driven by reversible motor means between forward most and rearward most positions relative to a work station and comprising:
   a control record having two spaced reverse marks recorded thereon for defining said forward most and rearward most positions;
   reverse sensor means for sensing said marks and providing a reverse signal pulse in response to each mark sensed;
   means for imparting relative motion between said control record and said sensor means in dependence upon the forward and backward directions of travel of said movable member relative to said work station;
   direction memory means having input and output circuits and a trigger pulse receiving circuit and exhibiting the characteristic of being actuated by a received trigger pulse to first and second stable state output circuit conditions in respective dependence upon first and second input circuit conditions existing when a trigger pulse is received;
   means for applying a said trigger pulse to said memory means in response to each said reverse signal pulse;
   direction command means controlled by said memory means to control said reversible motor means to drive said member in the backward direction each time said memory means is actuated to its first output circuit condition and in the forward direction each time said memory means is actuated to its second output circuit condition; and memory input conditioning means for conditioning said memory input circuit to its second condition when said member is traveling in said backward direction and to said first condition when said member is traveling in said forward direction.

11. In a machine control system as set forth in claim 10, including time delay means interposed between said reverse sensor means and said trigger pulse means for providing, for each said reverse signal pulse, a time delay control pulse having a time duration substantially in excess of a said trigger pulse and greater than the time period required for said movable member to first over travel a said forward most or rearward most position and retraverse passed said position so that a single said control pulse is provided for each said mark during a reversing operation.

12. In a machine control system as set forth in claim 11, including gating means interposed between said direction command means and said memory means so that said direction command means is controlled by said memory means for a time duration dependent upon that of said control pulse.

13. In a machine control system as set forth in claim 12, wherein said trigger pulse means provides a said trigger pulse at a point in time essentially corresponding with the leading edge of said control pulse and of sufficiently short duration so that upon termination of a said trigger pulse said memory means is actuated to one of its said output conditions before its input circuit condition is changed.

14. In a machine control system as set forth in claim 10, wherein said direction memory means includes first and second said input circuits for receiving a first and second pattern of binary signals respectively representative of said first and second input conditions, and first and second said output circuits for carrying said first and said second patterns of binary signals respectively representative of said first and second conditions.

15. In a machine control system as set forth in claim 14, wherein said memory input conditioning means includes circuit means for applying a said first pattern of binary signals to said first and second memory input circuits when said movable member is traveling in said forward direction and a said second pattern of binary signals thereto when said movable member is traveling in said backward direction.

16. In a machine control system as set forth in claim 10, wherein said control record has at least one position mark recorded thereon;

position sensor means for sensing a said position mark;

means for providing an indication that a said sensed reverse mark commanded reverse movement of said movable member from said forward direction to said backward direction; and control circuit means responsive to said indication to prevent said trigger pulse means from responding to a said reverse signal pulse until said position mark is sensed by said position sensor means.

17. In a method of operating a linearly movable member over different linear distances in opposite directions in accordance with different selective pre-established programs, wherein said programs are carried by a record member and each program includes at least one stop signal for controlling an intermediate stop position of the member when moving in one direction and a reverse signal at each end of each program beyond the extremities of stop signals contained therein, and wherein signal sensing means is provided to sense stop and reverse signals on the record member for controlling the movable member, said means being proportionately movable relative to said record member in response to movement of said linearly movable member, the improvement comprising the steps of:

a. moving said movable member in said one direction and intermittently stopping said member in response to sensing of each stop signal in a first program, b. sensing a reverse signal beyond the last stop signal in said first program and then:
 1. reversing the direction of travel of said movable member,
 2. selecting a second program and sensing for a stop signal therein during said reverse travel,
 3. inhibiting a said stop signal in said second program from stopping said movable member during said reverse travel, and
 4. inhibiting said sensing means from responding to a said reverse signal, c. reinstating the operability of said sensing means to respond to a said reverse signal upon receipt by said sensing means of a stop signal while said member is travelling in said reverse direction, d. reversing the direction of travel of said movable member in response to sensing a reverse signal at the extremity of said second program to cause said member to again travel in said one direction, and e. stopping said movable member in response to a said stop signal in said second program.

* * * * *